United States Patent
Ackermann et al.

[15] 3,687,899
[45] Aug. 29, 1972

[54] PROCESS FOR POLYMERIZING GASEOUS FORMALDEHYDE

[72] Inventors: Jacob Ackermann; Franco Ferre; Tetaz Felice, all of Milan, Italy

[73] Assignee: Societa Italiana Resine S.P.A.

[22] Filed: April 20, 1971

[21] Appl. No.: 135,748

Related U.S. Application Data

[63] Continuation of Ser. No. 723,471, April 23, 1968, abandoned.

[30] Foreign Application Priority Data

April 29, 1967    Italy..................15533 A/67

[52] U.S. Cl. ..............260/67 FP, 23/274, 260/95 C
[51] Int. Cl. .........................................C08g 1/02
[58] Field of Search......................260/67 FP, 95 C

[56] References Cited

UNITED STATES PATENTS

| | | |
|---|---|---|
| 3,172,736 | 3/1965 | Gee et al. ............260/67 FP X |
| 3,296,205 | 1/1967 | Köcher et al...........260/67 FP |
| 3,428,604 | 2/1969 | Jean et al. .............260/67 FP |
| 3,458,479 | 7/1969 | Lugo et al. .............260/67 FP |

*Primary Examiner*—Harold D. Anderson
*Assistant Examiner*—L. M. Phynes
*Attorney*—Sughrue, Rothwell, Mion, Zinn & Macpeak

[57]        ABSTRACT

A process for continuous suspension polymerization of gaseous formaldehyde is provided, wherein build-up of solid polymer on the reactor walls and stirrer is prevented by the use of a flexible stirrer, conveniently a chain of suitable size, which keeps itself clean and by impinging on the walls of the reactor under centrifugal force keeps them clean also.

11 Claims, 1 Drawing Figure

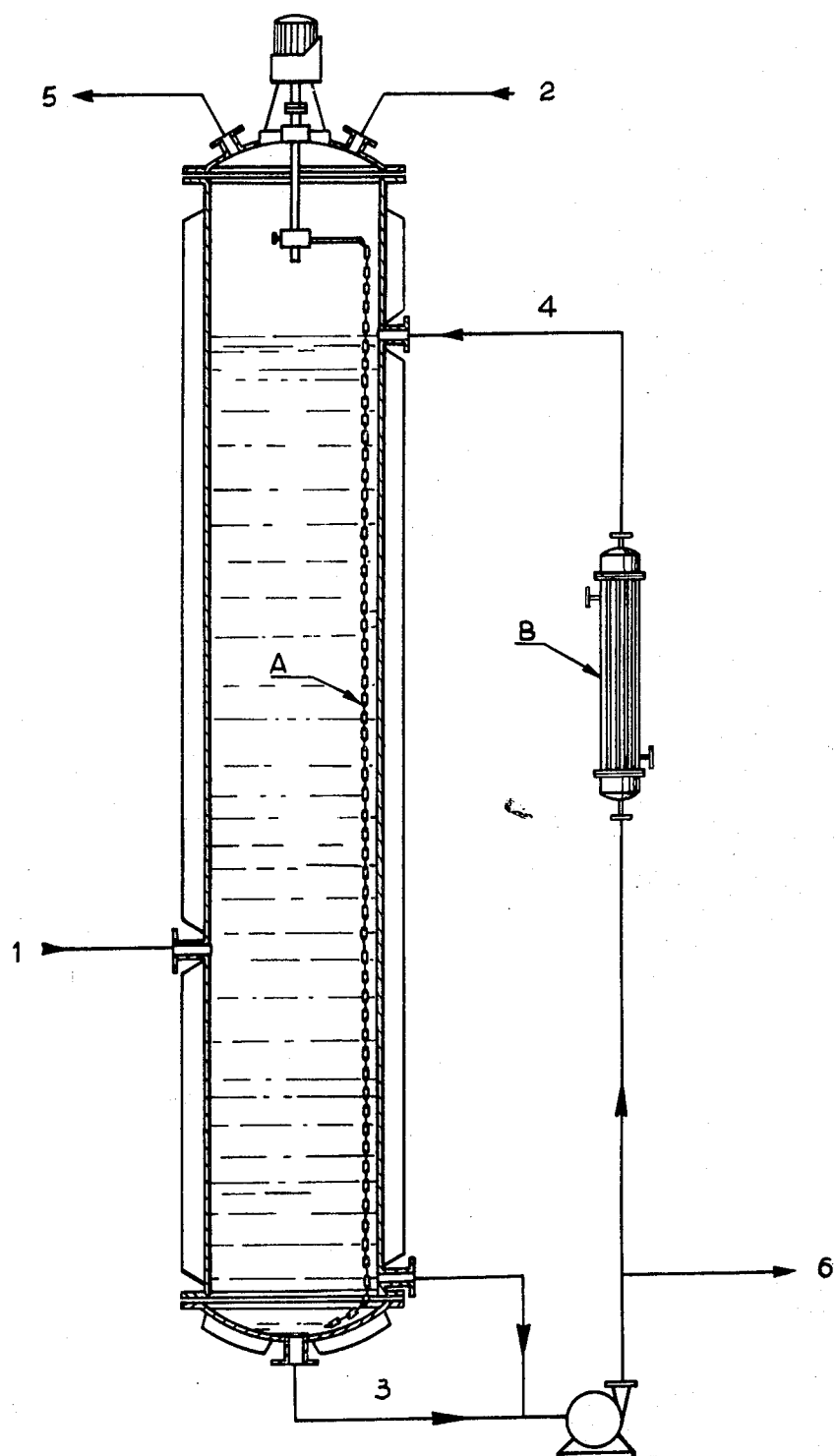

PROCESS FOR POLYMERIZING GASEOUS FORMALDEHYDE

CROSS-REFERENCE TO RELATED APPLICATION

The present application is a continuation of the now abandoned U.S. application, Ser. No. 723,471, filed Apr. 23, 1968 for "Process For Polymerizing Gaseous Formaldehyde."

This invention relates to a process for polymerizing gaseous formaldehyde in an inert liquid in the manufacture of high molecular weight polymers which are tough, thermally stable and useful for industrial purposes, such as films, fibers, plates and powders for moulding articles.

It is known that gaseous formaldehyde can be polymerized at −80° C to +80° C according to various techniques in order to obtain polymers of different types. Various techniques and polymers are described for instance by H. Staudinger in "Die Hochmolekularen Organischen Verbindungen" Julius Springer, Berlin 1932 and by J. F. Walker in "Formaldehyde" Reinhold Publishing Corp., New York, 1944.

Staudinger suggests inter alia the use of catalysts suitable for forming powders from gaseous formaldehyde, and describes polymerization in the absence of catalysts as well.

It is an inherent property of formaldehyde to polymerize on any surface, more particularly if cooled, and form very hard and bulky crusts. In industrial practice this creates difficulty in controlling the polymerization temperatures, and consequently makes it impossible to adjust efficiently the distribution of the molecular weights of the resulting polymer. Moreover, the gradual deposit of polymer on the reactor walls leads to unavoidable frequent stoppages in the operational cycle, for the purpose of cleaning the plant.

The prior techniques attempted to extend the period of operation of the various reactors for polymerizing formaldehyde in suspension with the aid of stirrers of various types, but the results were unsatisfactory owing to jamming of the stirrers due to excessive polymer fouling of the walls and stirrer.

An object of the invention is to provide a process for polymerizing gaseous formaldehyde in an inert solvent (such as acetone, ethanol or propanol) in order to prepare high molecular weight polymers.

A further object of the invention is to provide a polymerization process for gaseous formaldehyde on a commercial scale avoiding frequent interruptions in operation of the plant due to the necessity to clean the walls of the polymerization reactor from fouling by the polymer.

A further object of the invention is to provide a polymerization process more particularly suitable for preparing polymers of constant properties from formaldehyde, suitable for conversion to articles of good technological properties.

A further object of the invention is to provide a process using a polymerization reactor provided with a stirrer and suitable for continuous operation.

Accordingly, the present invention comprises a process for the continuous suspension polymerization of gaseous formaldehyde in the presence of an inert solvent in a stirred reactor, characterized by effecting the stirring by means of a self-cleaning flexible stirrer moved to scrape the walls of the reactor, and in preferred form characterized also by recycling at least part of the polymer suspension formed through an external heat exchanger to cool it prior to its return to the reactor, which is preferably a vessel of substantially cylindrical shape mounted vertically. The stirrer is conveniently caused to scrape the walls of the reactor by centrifugal force under rotation.

The stirrer preferably comprises a plurality of interlocked suitably dimensioned rings, so forming a chain, secured at the reactor top to a device which may be in the form of a bar or disc axially fixedly connected with a rotating shaft which is driven from a motor externally of the reactor.

In one preferred embodiment the chain is eccentric with respect to the reactor axis, when it is found that its scraping action on the walls is more effective. The main characteristic feature of this stirrer is that it exploits during movement the centrifugal force of the individual links, which impinge upon the reactor walls so that the chain scrapes the walls and removes any polymer crust deposited thereon.

A further preferred feature of the invention resides in the fact that the motor operates on a cyclic scheme consisting of a period of movement in one direction, a stationary phase, a period of movement in a reverse direction, and finally a further stationary phase. This cycle is continuously repeated throughout the operation of the reactor.

The fundamental advantage deriving herefrom is that the stirrer is capable of self-cleaning, which is probably due in the case of a chain to its articulated structure and the independent movements which can be performed by its links, thereby facilitating loosening of any polymer crust. A number of tests were carried out with different chain sizes, and by changing its point of attachment to the rotary device as well as the size of the chain links. Contrary to expectation, on the basis of conventional stirrers of the propellor or other rigid types, operation periods of hundreds of hours could be carried out by the device in the process of the invention. As to the weight of the chain or other flexible element, this should preferably be maintained between 2 and 10 kg/linear meter. The period of rotation of the device to which the chain is attached and alternatingly rotated in clockwise and counterclockwise direction, is usually maintained at values ranging between 5 and 60 seconds, preferably 10 and 30 seconds, alternating with stationary periods of 10 to 20 seconds.

The invention is further illustrated by reference to the sole FIGURE which shows diagrammatically the apparatus utilized for carrying out the invention. The reactor comprises a jacketed stainless steel tower through which a liquid for controlling temperature is circulated. The shaft transmitting rotary motion, the rotary device and the flexible member or, in the preferred embodiment, the links of the chain (A) are made of metallic material which is unattacked under the reaction conditions.

The previously purified gaseous monomer is fed through line 1 to the reactor filled to 85 percent of its volume with a polymer suspension previously formed in a solvent (e.g., acetone) which is inert towards the gas supplied. A pump draws the reactor contents from the base of the reactor through line 3 and conveys it to the top of the reactor through line 4 and heat exchanger B.

The reaction heat is removed in part by the heat exchanger B and the fluid circulating in the reactor jacket, respectively.

A part of the suspension is continuously drawn through line 6. This corresponds to the quantity of polymer formed in the reactor upon the addition of gaseous monomer. The make-up solvent and the selected catalyst are introduced through line 2, the unreacted gas and inert materials being removed through line 5. The concentration of the polymer in the suspension may reach 150 g/l, but is preferably not above 100 g/l because with higher concentrations the viscosity of the circulating mass becomes excessive. Though there is no lower limit, the concentration preferably does not sink below 20 g/l in order to avoid an excessive volume of solvent to be separated from the polymer.

In the preferred embodiment the reactor content is recycled at a rate such as to remove the content thereof 1 to 100 times during 1 hour.

It has been found that recycling is advantageous, though not strictly essential, as it will increase the yield referred to the reactor volume.

The range of recycle values as defined above is recommended by the following considerations: with values below 1 no appreciable effects are obtained, values exceeding 100 are undesirable because then the polymerization of the monomer is not completed within the reactor, but continues in the pipings and heat exchanger which become fouled.

The force by which the flexible member wipes the reactor wall depends upon the number of revolutions of the rotary device and the reactor diameter, in addition to the weight of the member itself, according to the relation:

$$F = 0.001\ GRn^2,$$

wherein $G$ = weight of the flexible member
$R$ = radius of the reactor in meters
$n$ = number of revolutions per minute.

It has been found that with a given value of the reactor radius the preferred number of revolutions for the purposes of the invention is selected so that the value of $F$ ranges between 1 and 5 kg/linear meter of the flexible member, the calculation referring to the empty reactor.

The reactor may be jacketed, alternatively or in addition to the recirculation, the heat of polymerization or part of it being removed by fluid circulating in the jacket.

We claim:

1. In a process for the continuous suspension polymerization of gaseous formaldehyde at a temperature of −80° to 80° C to form a formaldehyde polymer comprising introducing gaseous formaldehyde into the intermediate portion of a reaction zone containing a suspension of formaldehyde polymer in an inert liquid, said liquid being a solvent for the formaldehyde and essentially a non-solvent for the polymer, agitating said suspension in said reaction zone, and withdrawing a portion of said suspension from the lower portion of said reaction zone to obtain said formaldehyde polymer, the improvement which comprises:

1. scraping the interior surface of said reaction zone in a clockwise direction for from 5 to 60 seconds by contacting said surface with a flexible self-cleaning element;
   2. allowing said suspension to stand, without agitation, for a period of from 10 to 20 seconds;
   3. scraping the interior surface of said reaction zone in a counterclockwise direction for from 5 to 60 seconds by contacting said surface with a flexible self-cleaning element;
   4. allowing said suspension to stand, without agitation, for a period of from 10 to 20 seconds; and
   5. repeating steps (1), (2), (3) and (4), whereby said suspension is agitated substantially only in proximity to the interior surface of said reaction zone, thereby minimizing deposition of polymer on the interior surface of said reaction zone and said flexible self-cleaning element.

2. The process according to claim 1, wherein at least part of the polymer suspension is removed, cooled, and recycled to the reaction zone.

3. The process according to claim 2, wherein the suspension is recycled 1 to 100 times per hour.

4. The process according to claim 1, wherein the concentration of the polymer in the suspension is maintained at 20 to 150 g/liter.

5. The process according to claim 1, wherein the force by which the flexible self-cleaning element contacts and scrapes the reaction zone surfaces ranges between 1 and 5 kg/linear meter of said flexible self-cleaning element, said force being calculated as $F$ and the formula $$F = 0.001\ GRn^2$$

wherein $G$ is the weight in kilograms of the flexible self-cleaning element, $R$ is the radius in meters of the arc of rotation of the flexible self-cleaning element and $n$ is the number of revolutions per minute.

6. The process of claim 1 wherein said flexible self-cleaning element comprises a chain.

7. The process of claim 1 wherein $G$ varies from 2 to 10 kilograms per linear meter of said flexible self-cleaning element.

8. The process of claim 1 wherein said reaction zone comprises a cylindrically shaped reactor filled to about 85 percent of its volume with said suspension.

9. The process of claim 1 wherein said inert liquid comprises acetone, ethanol or propanol.

10. The process of claim 1 wherein the amount of suspension removed from said reaction zone is equal to the quantity of formaldehyde polymer formed in said reaction zone upon introduction of gaseous formaldehyde therein.

11. The process of claim 1 wherein the formaldehyde polymer deposited on the interior surface of said reaction zone is continuously removed by forcibly scraping said surface, the force with which the scraping is performed being variable to insure that substantially all of the formaldehyde polymer deposited on said surface is removed therefrom by said scraping operation.

* * * * *